(No Model.)
J. H. BEVINGTON.
MODE OF WELDING THE ENDS OF WIRE, RODS, &c.
No. 463,134. Patented Nov. 17, 1891.
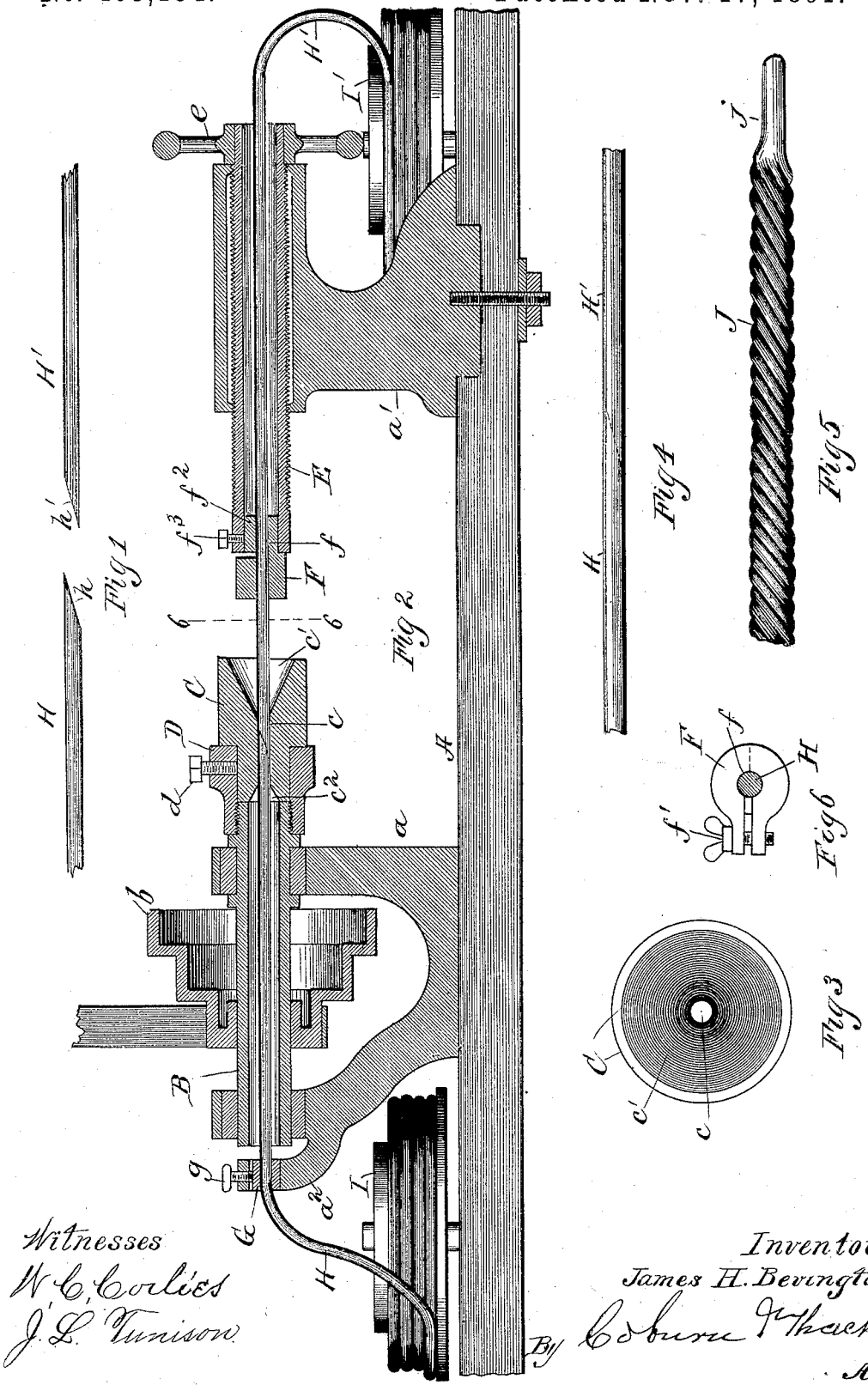
Witnesses
W. C. Corlies
J. L. Tunison
Inventor
James H. Bevington,
By Coburn & Thacher
Attys

UNITED STATES PATENT OFFICE.

JAMES H. BEVINGTON, OF CHICAGO, ILLINOIS, ASSIGNOR TO THE NEW PROCESS WELDING AND SPINNING COMPANY, OF SAME PLACE.

MODE OF WELDING THE ENDS OF WIRE, RODS, &c.

SPECIFICATION forming part of Letters Patent No. 463,134, dated November 17, 1891.

Application filed February 9, 1891. Serial No. 380,770. (No model.)

*To all whom it may concern:*

Be it known that I, JAMES H. BEVINGTON, a citizen of the United States, and residing at Chicago, in the county of Cook and State of Illinois, have invented a certain new and useful Improvement in Processes for Welding Metals, which is fully set forth in the following specification, reference being had to the accompanying drawings, in which—

Figure 1 represents sections from the ends of two separate wires or rods prepared for welding; Fig. 2, a longitudinal vertical section of the welding-machine; Fig. 3, a front end elevation of the welding-die; Fig. 4, an elevation of the rods or wires after welding; Fig. 5, an elevation of a section of wire cable, showing the several wires welded together at one end; and Fig. 6 a detail cross-section, taken on the line 6 6 of Fig. 2. Figs. 1 and 2 are upon one and the same scale. Figs. 3, 4, and 6 are upon the same scale, but enlarged from the preceding, and Fig. 5 upon a scale by itself without reference to the other figures.

My invention relates to a process for welding together the ends of metal wire, rods of metal, and other like pieces of solid metal.

The invention consists in subjecting the ends of the solid rods or wires, suitably lapped, to the action of a rapidly-revolving die, within which the joined ends of the rods are held.

In Letters Patent No. 444,721, granted to me January 13, 1891, I have shown and described a process for spinning tubes and welding their ends together. Since my application for said Letters Patent I have discovered that the broad idea of heating the metal for welding purposes by a rapidly-revolving die is also applicable to the welding together of pieces of solid metal—such, for instance, as wire of different sizes, solid rods of different sizes and also of different shapes—and it is this improvement in welding processes which forms the subject-matter of the present application.

I will proceed to describe one way of carrying out my process practically, and will then point out in claims the particular improvements which I believe to be new and wish to secure by Letters Patent.

A machine adapted to carry out my process is something like a lathe, and, as shown in the drawings, is constructed with a bed A, on which are mounted standards $a$ $a'$, the former of which is preferably forked or provided with two branches. A hollow shaft B is mounted in the standard $a$ and has fixed upon it a driving-pulley $b$, by means of which this shaft may be very rapidly revolved. A circular die C is secured upon the inner end of this hollow shaft. It is inserted by its stem in a suitable die-holder D, which is fastened to the end of the shaft by a screw-threaded connection, as seen in Fig. 2, and the die is secured in the holder by means of a binding-screw $d$. This die is of very hard metal and has a central perforation $c$ running through it, and conical or flaring openings at each end communicating with this central perforation, the opening $c'$ at the inner end being much larger than the one $c^2$ at the other end. Obviously the rotation of the shaft will correspondingly rotate this die. A hollow spindle or tail-stock E is mounted in the other standard $a'$ by a threaded bearing, so that it can be set in and out, for which purpose it is provided with a hand-wheel $e$. A clamp F is set in the inner end of this tube, which is adapted to hold the rod or wire from turning. For this purpose it is provided with a central perforation $f$ and is divided in part, as seen in Fig. 6 of the drawings, the two parts at the division being fastened together by means of a screw $f'$. This is a well-known clamp and its action will be readily understood. The clamp has a plug-stem $f^2$, by means of which it is set in the end of the tube, where it is fastened by a binding-screw $f^3$. At the rear end of the standard $a$ is a short arm $a^2$, in which is mounted a divided or slitted bushing G, that is secured in place by a binding-screw $g$, which also serves to clamp the bushing down upon the rod or wire inserted at this end of the machine to hold it from turning.

For the purpose of illustration I have in the drawings shown this machine in operation upon wires. The two wires H and H' are, preferably, prepared by cutting the ends upon an incline, so as to give each a bevel $h$ $h'$. One of the wires H is thrust through the hollow shaft and part way through the die, so that its beveled end will be within the central perforation in the die, and the wire is fastened in this position by means of the clamp-bushing G. The other wire H' is inserted in the tubular spindle and passed out through the clamp F a little way and is then firmly secured in place by means of this clamp. The tube is then fed inward until the beveled end of the wire is forced into the die and brought firmly against the bevel of the other wire, as seen by the dotted line in Fig. 2. The die is then very rapidly revolved by the means already explained, while of course the two wires are held in a fixed position and forced together. During this rapid movement of the die a very high degree of heat is developed by frictional contact, which is of sufficient intensity to heat the two ends of wire to a welding-heat and perfectly weld them together along their contact-faces. The union thus obtained is as complete and perfect as a welded joint can well be made, and, owing to the action of the die, the joint is smooth and in fact is almost imperceptible, the finished wire presenting the appearance seen in Fig. 4 of the drawings, where the joint is indicated by a dotted line, though it would hardly be perceptible in the finished article.

Obviously, with the machine constructed as described above, the wire after being welded must be drawn through at one end of the machine. For illustration I have in the drawings shown the wire H on a spool I, mounted at one end of the machine, and the wire H' on a spool I' at the other end. After welding, the wire may be drawn through, being run off from one spool and wound upon the other, the clamps of course being loosened for this purpose, and so length after length of wire may be joined together to form a line of any length desired. Two rods may be welded together in the same way, one being set in the standard $a$ and the other in $a'$, as described. The operation will be understood without any further explanation. The rod set in the tube in the standard $a'$ will of course be fed up forcibly against the end of the opposite rod.

I have found that this process of welding may be successfully applied to wires and rods of very considerable size. The process has been practically tested with entirely successful results to rods of different sizes up to an inch in diameter, and probably may be carried on successfully with even larger sizes.

This process may be employed also with rods of angular shape, for it is obvious that the action of the die will wear away the angles, reducing the section at the joint to a round form, and this section may afterward be restored to angular form by any suitable forging operation, if desired.

The process is also applicable in a variety of directions other than the simple welding together of the ends of opposing rods or wires. An illustration is shown in Fig. 5 of the drawings. In transporting wire cables the ends will become frayed frequently, and it is quite difficult to find means for securing them so as to prevent the separation of the strands. In Fig. 5 a section of wire cable J is shown with the strands at the free end welded together, thus forming a short solid end $j$. This is accomplished by inserting the end of the cable in a die like the one shown in the drawings and rapidly revolving the latter, whereby the ends of the wires are fused and welded together. Evidently in this instance the wires lie alongside each other instead of abutting against each other, as in the instance described above. The wires at the end of the cable are thus securely fastened together in a way that will be perfectly reliable for all purposes.

This process of welding is adapted to all metals which are susceptible to a welding process. The process may also be carried out by mechanism of varied construction, for it is obvious that the mechanism must be adapted to the particular shapes and conditions of the material upon which it is to operate. It will be understood, therefore, that I do not intend to limit my invention either to the machine here shown and described or any other.

The machine shown in the drawings and described above is given simply as an illustration of one way in which the process may be practically carried out, but without any intention of limiting it to the use of this machine. Even in this machine it is obvious that the die and devices in which the wires are held may be sectional, so as to avoid the necessity of drawing through the machine.

Having thus described my invention, what I claim as new, and desire to secure by Letters Patent, is—

1. The herein-described process of welding solid metal rods, wires, &c., the same consisting in bringing the ends together in contact with each other within a hard-metal die, and then rapidly revolving the latter while in contact with the former, substantially as and for the purposes specified.

2. The herein-described process of welding together the ends of solid metal rods, wires, &c., the same consisting in forcing the abutting ends of the rods or wires to abut against each other within a hard-metal die, and then rapidly revolving the latter about the former and in contact with the two abutting ends, substantially as and for the purposes specified.

JAMES H. BEVINGTON.

Witnesses:
CARRIE FEIGEL,
A. M. BEST.